W. R. COCHRAN.
SHOCK ABSORBER FOR VEHICLES.
APPLICATION FILED JAN. 26, 1921.
1,425,176. Patented Aug. 8, 1922.
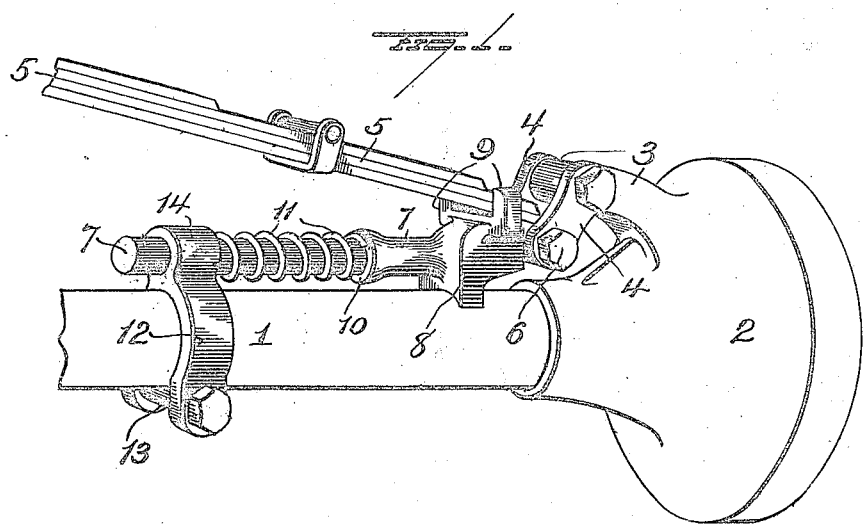
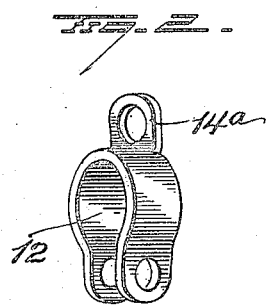

UNITED STATES PATENT OFFICE.

WILLIAM R. COCHRAN, OF DELPHOS, OHIO, ASSIGNOR OF TWO-THIRDS TO BERIEN E. JORDAN AND JOHN C. JORDAN, BOTH OF DETROIT, MICHIGAN.

SHOCK ABSORBER FOR VEHICLES.

1,425,176. Specification of Letters Patent. Patented Aug. 8, 1922.

Application filed January 26, 1921. Serial No. 440,093.

*To all whom it may concern:*

Be it known that I, WILLIAM R. COCHRAN, a citizen of the United States, and a resident of Delphos, in the county of Allen and State of Ohio, have invented certain new and useful Improvements in Shock Absorbers for Vehicles; and I do hereby declare the following to be a full, clear, and exact description of the invention, such as will enable others skilled in the art to which it appertains to make and use the same.

This invention relates to an improvement in shock absorbers for vehicles and is designed more particularly for those in which a semi-elliptic spring is connected at its ends with the axle, as in the Ford automobile, and it consists in the parts and combination of parts as will be more fully explained and pointed out in the claims.

The accompanying drawing Figure 1 is a view perspective of my invention applied to the rear axle of a vehicle, and Figure 2 is a view of a modified form of clip.

1 represents a sleeve or casing enclosing the rear axle of an automobile, and 2 the brake-wheel housing carrying bracket 3 to which the spring suspending links 4 are pivotally mounted in the usual and well known manner. 5 is the vehicle spring, semi-elliptic in shape and secured at its ends to suspension bolts 6 which are carried in the free depending ends of the spring suspending links 4.

The construction thus far described is the well known construction now in common use on Ford and other machines. My improved shock absorber comprises a plunger 7 provided with an end head or block 8 having upwardly projecting lugs 9 which embrace the opposite sides of the vehicle spring 5 near the free end of the latter and prevent lateral vibration of the same. The lower face of the block 8 is curved to conform to the sleeve 1 or to the axle as the case may be and rests thereon, and the extreme outer end of the block is adapted to bear against the free ends of the links or against the ends of the vehicle spring 5 secured to said bolt 6. This plunger is provided with a shoulder 10 against which one end of the coiled spring 11 bears. This latter spring embraces the rounded inner end of the plunger 7 and bears at its opposite end against the clip 12 which latter is yoke-shaped as shown and is secured to the sleeve 1 or to the axle by the bolt 13 and suitable clamping nut. This clip is of course open at its lower end, the opening being sufficiently large to pass over the sleeve or the axle, and is clamped on the sleeve or axle after the parts have been properly assembled. This clip is provided with an upward extension 14 having an opening therethrough for the passage of the plunger 7, and this upward extension forms an abutment for the opposite end of the coiled spring 11.

In Figure 1 I have shown the clip 12 with an upward extension equal in width to the body of the clip, but if desired, the latter may be struck up from sheet metal and the end extension 14ª turned up, as shown in Figure 2.

In assembling the absorber the spring and clip are applied to the plunger 7 and the spring is put under tension by a nut or similar device applied to the free end of the plunger and bearing of course against the extension 14 of the clip 12. The plunger with spring thus under tension is then applied to the sleeve of the vehicle when the vehicle spring 5 is in its normal condition or not compressed. The plunger is applied to the sleeve 1 with the free end of its block 8 in contact with the free ends of the links 4, or with the end of the spring 5 which is looped around the bolt 6 after which the clip 12 is clamped to the sleeve by the bolt 13. This holds the spring 11 under tension and the block 8 of the plunger in contact with the free ends of the links 4, hence it will be seen that as the spring 5 bends under a load, the follower block 8 follows up the movements of the links 4 so that in the rebound of the vehicle spring 5 the shock is all absorbed by the coiled spring 11. The spring 11 is of such strength as to obstruct the free return movement of the links 4 and thus causes the latter, after a compression of the spring 5, to return to normal position slowly and without the rebound that occurs when the spring 5 is not under control.

This device is complete in itself and can be applied to any vehicle in which the springs 5 are located parallel with and above the axle, without any change whatsoever in the construction of the vehicle, it being simply necessary to first put the spring 11 under tension and secure the clip to the sleeve 1 after which the nut or other device used for compressing the spring 11 is removed, thus permitting the plunger 7 to move freely and follow up the links 4 as they are moved under the action of the vehicle springs 5.

While I have referred to this absorber in connection with the rear axle of a machine, it will of course be understood that it is applied to both ends of vehicle spring 5 and it may be applied to the forward axle in precisely the same manner and operate in precisely the same way.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. As a new article of manufacture, a shock absorber, comprising a plunger provided at one end with a head adapted to rest and be supported on the vehicle axle or casing for the latter and bear against vehicle spring supporting links, a clip carrying said plunger and adapted to be secured to an axle or axle casing, and a spring mounted on said plunger and bearing at one end against the same and at the other end against the clip.

2. As a new article of manufacture, a shock absorber, comprising a plunger provided with a block at one end adapted to rest and move on an axle or axle casing and bear against the free ends of the links supporting the vehicle spring, the said plunger being provided with a shoulder, a coiled spring embracing the said plunger at the rear of the shoulder and bearing against the latter, and a clip through which the rear end of the plunger passes and against which the rear end of the spring bears, the said clip adapted to be detachably secured to an axle or axle casing.

3. The combination of a plunger having a head at one end the latter resting and movable on the axle or axle casing and provided with upwardly turned lugs adapted to embrace the opposite sides of a vehicle spring, a coiled spring embracing the plunger and bearing at one end against the shoulder thereon, and a clip through which the rear end of said plunger moves and against which the rear end of said spring bears, the said clip adapted to be detachably secured to a vehicle axle or casing for the latter.

4. In a shock absorber for vehicles, the combination of a plunger, the outer end of which is provided with a head the lower face of which is curved to conform to the contour of the vehicle axle or axle casing, the said head being provided with upwardly projecting lugs adapted to embrace the opposite sides of the vehicle spring, a coiled spring embracing the plunger and bearing at one end against the shoulder on the latter, and a clip through which the rear end of said plunger passes and against which the inner end of the coiled spring bears, the said clip adapted to be detachably secured to a vehicle axle or casing for the latter.

In testimony whereof, I have signed this specification in the presence of two subscribing witnesses.

WILLIAM R. COCHRAN.

Witnesses:
 LEWIS E. FLANDERS,
 ANNA M. DORR.